June 9, 1942.  A. C. VAN HOOYDONK  2,285,951
BACON SKINNING MACHINE
Filed April 5, 1940   4 Sheets-Sheet 4
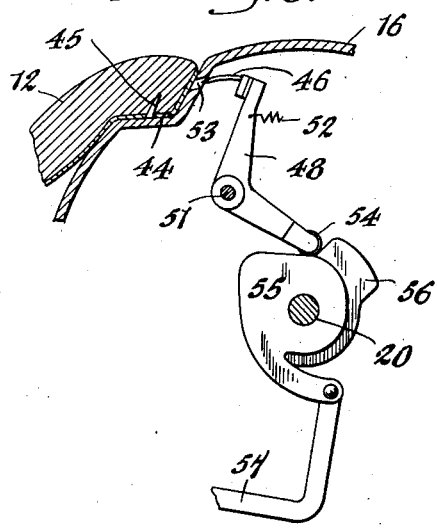
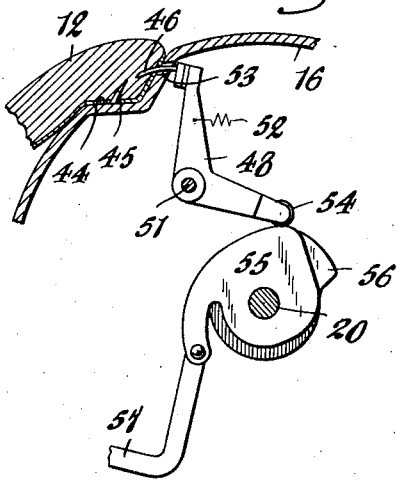
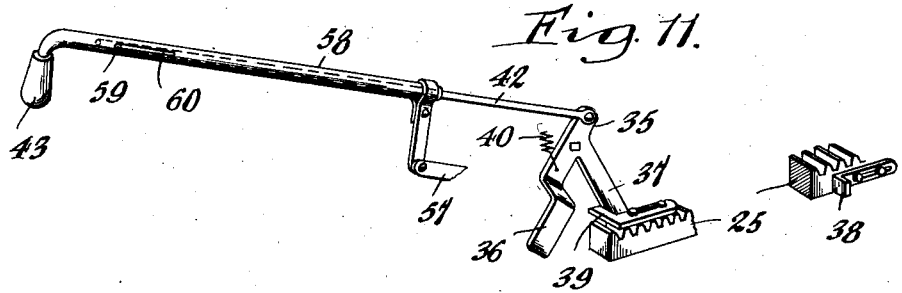
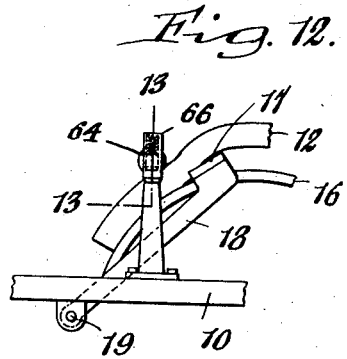
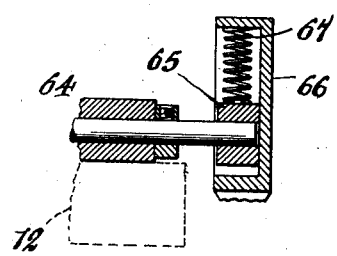

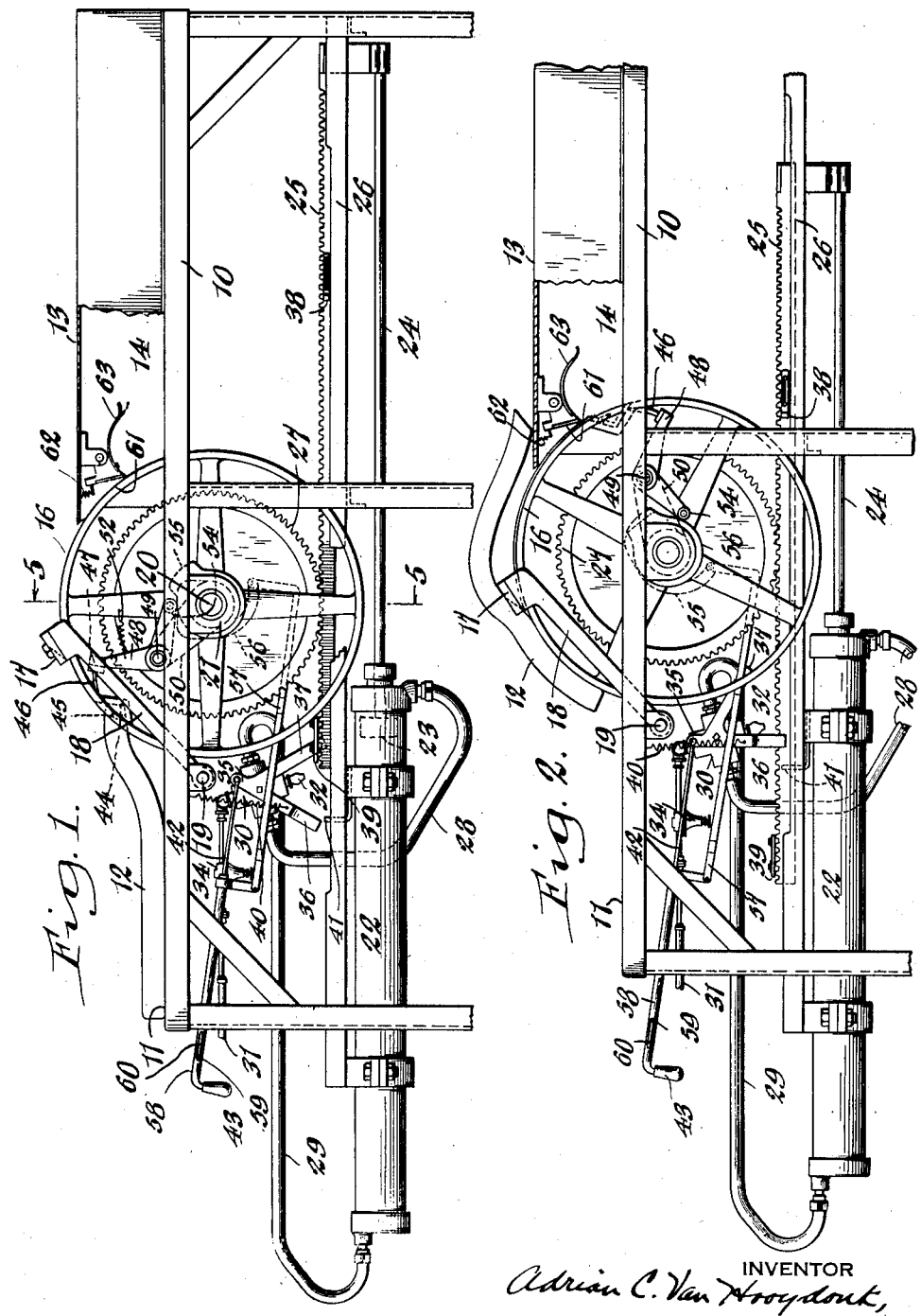

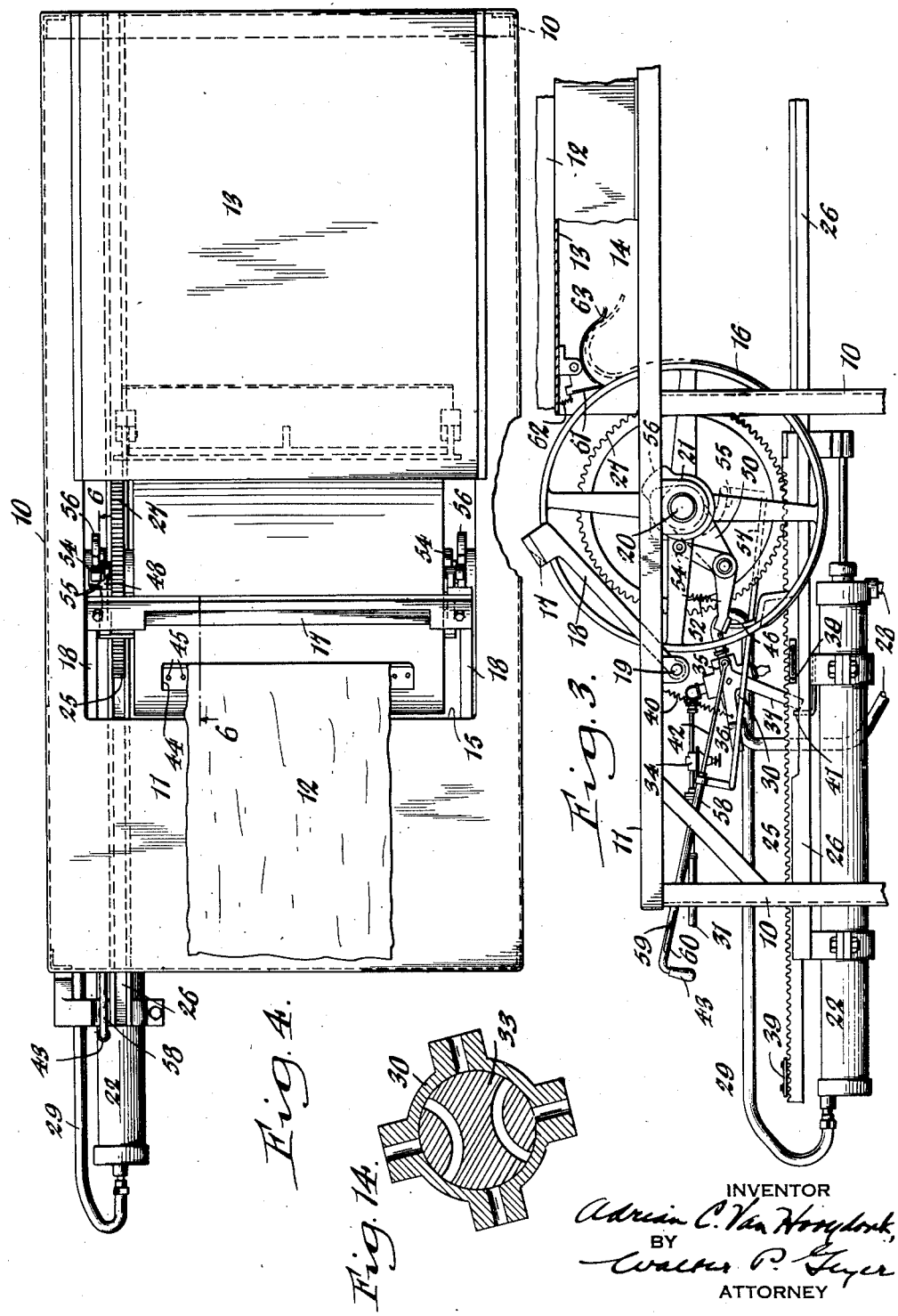

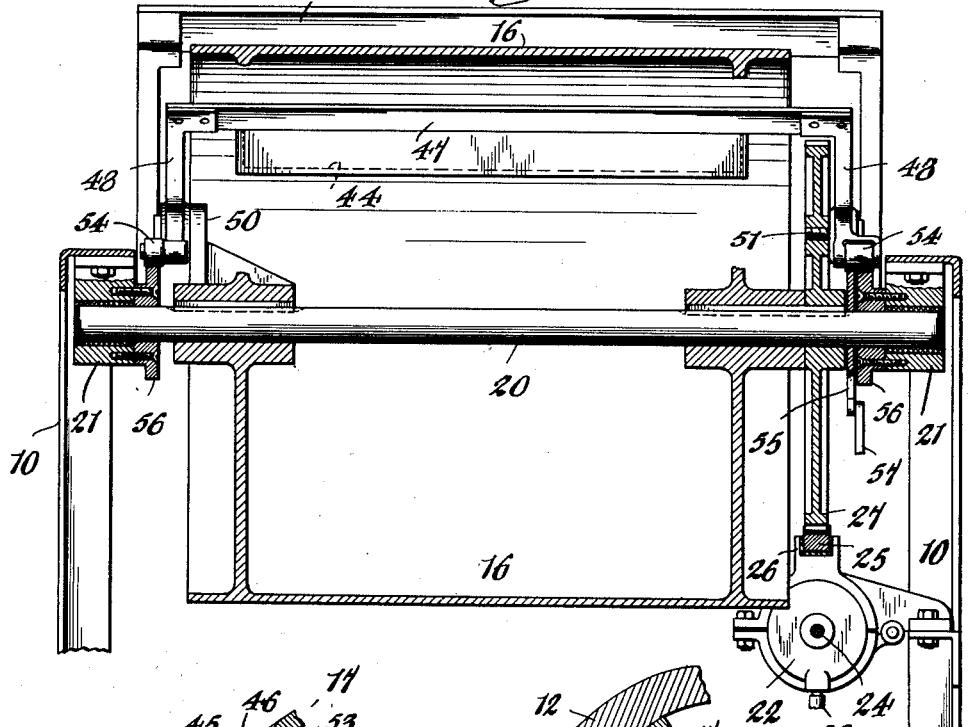
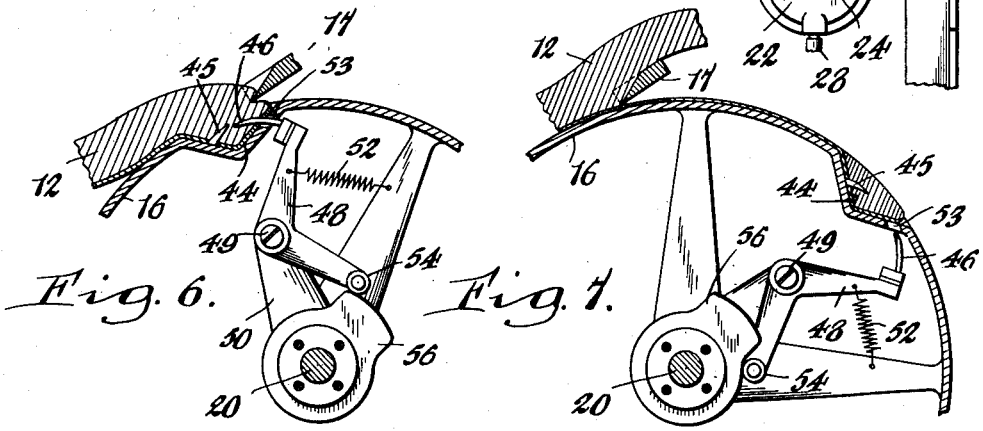
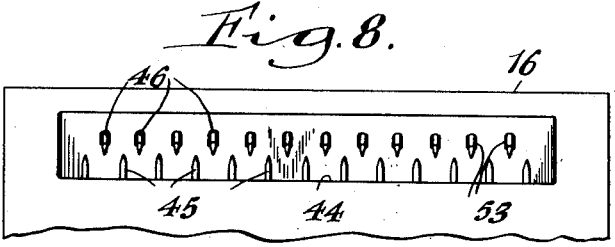

Patented June 9, 1942

2,285,951

UNITED STATES PATENT OFFICE 2,285,951

BACON SKINNING MACHINE

Adrian C. Van Hooydonk, Buffalo, N. Y., assignor to John E. Smith's Sons Company, Buffalo, N. Y., a corporation of New York Application April 5, 1940, Serial No. 328,069

14 Claims. (Cl. 146—130)

This invention relates to a machine for skinning or stripping the hide from slabs of bacon.

It has for one of its objects to provide a machine of this character which is so designed and constructed as to require no preliminary manual acts to prepare the bacon for skinning, and which automatically and effectually removes the skin from bacon.

Another object of the invention is to provide a bacon skinning machine embodying relatively movable carrier and cutter mechanism arranged to sever the skin from the bacon during an operative stroke and to dispose of the severed piece of skin during the return stroke of the mechanism, whereby the machine is ready for the next skinning operation.

A still further object is the provision of an oscillating carrier having simple and effective means for releasably holding the bacon thereon during the skinning operation.

A further object of the invention is to provide positive and reliable means for automatically governing the operation of the machine.

Another object is to provide a machine for skinning bacon which is simple, compact and inexpensive in construction, which is reliable and efficient in operation, and which is adapted to skin both fresh and smoked bacon.

In the accompanying drawings:

Figure 1 is a side elevation, partly in section, of the machine with the parts in position for starting the skinning operation. Figure 2 is a similar view of the machine showing the parts in an operative skinning position. Figure 3 is a similar view showing the position of the parts at the start of the reversing operation for removing the severed skin from the carrier-drum. Figure 4 is a top plan view of the machine with the parts in the position shown in Figure 1. Figure 5 is an enlarged fragmentary cross section taken on line 5—5, Figure 1. Figure 6 is an enlarged fragmentary longitudinal section taken on line 6—6, Figure 4. Figure 7 is a similar section, but showing the skinning operation at a more advanced stage and with the releasable retaining claws removed from the bacon. Figure 8 is a fragmentary face view of the carrier-drum, showing the retaining claws for clamping the bacon thereto. Figures 9 and 10 are fragmentary sectional views, similar to Figure 6, showing the released and operative positions, respectively, of the manually adjustable, claw-actuated cam. Figure 11 is a fragmentary perspective view of the valve-actuating lever and associated parts. Figure 12 is a fragmentary side elevation showing a pressure roller mounting which may be employed for retaining the bacon to the drum adjacent the cutting zone. Figure 13 is an enlarged vertical section thereof taken on line 13—13, Figure 12. Figure 14 is an enlarged cross section of the control valve.

Similar characters of reference indicate corresponding parts throughout the several views.

In its general organization, my bacon skinning apparatus comprises a supporting table or platform at one side of which the bacon is placed for presentation to a rotatable carrier or drum which in turn directs and guides the bacon to a knife for severing the skin from the bacon, the skin being held to the periphery of the drum during its operative or skinning stroke and the meat portion being directed to the opposite side of the table, after which, on the return stroke of the carrier-drum, means are provided for removing the skin from the drum and deflecting it to a discharge point below the top of the table; means for releasably clamping the bacon to the carrier during the skinning operation; means for automatically governing the actuation of such clamping means at predetermined times in the operative stroke of the carrier-drum; and means for actuating the drum in opposite directions including control devices for automatically governing such movement of the drum at predetermined times in its cycle of operations.

The working parts of the machine are mounted on a supporting frame 10 having a platform or portion 11 at one end for receiving the bacon 12 to be skinned, and another platform or portion 13 spaced therefrom for receiving the skinned bacon. Below the platform 13 is a space or chamber 14 for receiving the severed skin of the bacon. Disposed substantially centrally of the frame between the platforms 11 and 13, is an opening 15 through which extends a reversibly movable carrier 16 which is preferably in the form of a drum or cylinder for conveying the bacon during the skinning operation, as the drum is moved in one direction, from the platform 11 to the platform 13, while on the reverse movement of the drum the severed skin, which clings to the drum during the skinning operation, is removed therefrom and directed into the chamber 14. Disposed in overlying relation to the drum between the platforms 11 and 13 is the skinning knife 17 which is suspended at the free ends of vertically-swinging arms 18 pivoted at 19 to the frame 10, whereby the knife may be swung clear of the drum when desired. In its operative position shown in the drawings, it is urged by its own weight toward the periphery of the drum.

This carrier-drum is mounted on a horizontal driven shaft 20 journaled in suitable bearings 21 carried by the frame 10, and is adapted to be driven in one direction a predetermined distance sufficient for accomplishing the skinning operation, and to thereupon be automatically reversed to move in the opposite direction for effecting the removal of the severed skin from the drum while returning the latter to its initial position preparatory to performing the next cycle of operations. For this purpose, I provide an automatically - governed, pneumatic transmission means consisting of a horizontally-disposed cylinder 22 mounted on the lower portion of the frame 10, a piston 23 operating in the cylinder and having its connecting rod 24 joined to a longitudinally-movable rack bar 25 guided in ways 26 and meshing with a gear 27 fixed on the drum-shaft 20, whereby when the piston is moved to the left, viewing Figure 1, the drum is moved clockwise for propelling the bacon forwardly and effecting the skinning operation, and when the piston is moved in the opposite direction the drum is turned in a counter-clockwise direction to effect the removal of the skin, which adheres to the drum, from the same. Connected to opposite ends of the cylinder 22 are air lines 28, 29 which are connected to a two-way valve 30, of any suitable and well-known construction, connected to an air supply pipe 31 and having an exhaust port 32, the valve-plug 33 being adapted to be set in one position for supplying air pressure to the air line 28 to effect the movement of the piston 23 in one direction, while the air in the cylinder is exhausted through the companion air line 29 and exhaust port 32. When the valve is set in its other position, air pressure is supplied through the pipe line 29 to move the piston in the opposite direction with the air being exhausted from the cylinder through the companion pipe line 28 and the exhaust port 32. Interposed in the air supply pipe 31 is a manual control valve 34. Applied to the valve-plug 33 is a control lever 35 having angularly-displaced tappet arms 36 and 37 which are adapted to be disposed, respectively, in the path of travel of companion trip lugs 38 and 39, respectively, applied adjacent the opposite ends of the rack bar 25. The trip lug 38 is applied to one side of the latch bar and its companion tappet arm is laterally offset at its lower end to extend over the companion side of the rack bar, while the other trip lug 39 may be applied to the top side of the rack bar and with its companion tappet arm 37 extending over the opposite side of the bar. A spring 40 connected at one end to the frame 10 and at its other end to the tappet arm 36 of the valve-controlling lever 35 tends to swing such lever and valve-plug 33 from its drum advancing position shown in Figure 2 to its drum-reversing position shown in Figure 3, after it has been initially tripped by the lug 38. It will be noted, as shown in Figure 2, that this spring is so disposed that in the position of the parts shown in Figure 2, the spring is acting on the dead center line intersecting the lever-tappet 36 to maintain the lever in such position. However, as soon as the trip lug 38 encounters the tappet arm 36 it moves the lever 35 past such dead center line in a clockwise direction, the spring 40 thereupon promptly turning the lever to the position shown in Figure 3. In this position the tappet arm 37 is adapted to abut against a fixed stop 41 disposed in its operating path to limit the movement of the valve control lever when under tension of the spring. Extending from the lever 35 is an operating rod 42 terminating in a handle 43, whereby the operator may adjust the valve 30 from the closed position shown in Figure 1 to the open position shown in Figure 2 for operating the drum 16 in a direction to perform the skinning operation.

Means are provided for releasably clamping the leading end of the slab of bacon to the carrier drum 16 to pull it therewith during the skinning operation, and at the same time permit the release of the skinned portion of the bacon from the drum during the return of the latter to its initial position. For this purpose, the drum is provided in its periphery with a longitudinal recess 44 extending substantially the full length of the drum and is substantially angle shape in cross section to receive the leading end of the bacon in the manner shown in Figures 1, 6, 9 and 10. Projecting into the recess from one of its walls is a row of anchoring pins or prongs 45 with which the lower front end of the bacon is adapted to be engaged, while in the opposite wall of this recess is a row of similar prongs or claws 46 which are adapted to releasably penetrate the leading edge of the bacon in the manner shown in Figures 6 and 10. The releasable prongs are applied to a common bar 47 which extends lengthwise through the drum and is fixed at its ends to one of the arms of vertically-swinging bell crank levers 48 mounted for movement with the drum. One of these bell crank levers is fulcrumed at 49 to a radial arm 50 extending from the hub of the drum, while the companion bell crank lever 48 is fulcrumed at 51 to the web of the gear 27. A spring 52 is connected to each of these bell crank levers for normally urging it to swing in a direction to retract its prongs from the registering openings 53 in the adjoining wall of the recess 44. The other arm of one of the bell cranks is provided with a roller 54 which engages companion cams 55, 56 disposed side by side axially at one end of the shaft while the companion arm of the other bell crank has a like roller engaging a like cam 56, the cam 55 being loose on the shaft and the cams 56 fixed to the bearing housings 21, as shown in Figure 5, to be held against rotation relative to the shaft.

The cam 55, which may be disposed between the companion cam 56 and the gear 27 for engagement with the adjoining lever-roller 54, is manually adjustable from the handle 43 in such a manner that before the valve 30 is opened to effect the skinning operation, the cam is initially actuated at the fore part of such handle-stroke to turn it from its normal inoperative position shown in Figure 9 to its operative claw-engaging position shown in Figure 10. To this end, this cam is pivotally connected by a link or tie member 57 with a sleeve 58 guided on the operating rod 42 and connected thereto by a pin and slot connection 59, 60, respectively, whereby a lost motion connection is provided between these parts to enable the sleeve, upon pulling the handle 43, to be actuated independently of the rod 42 to first turn the cam 55 in a direction to rock the levers 48 outwardly to bring the claws 46 into penetrating anchoring engagement with the slab of bacon to be skinned before presenting into engagement with the knife 17. In this position of the cam 55, its high point is flush with that of the companion cam 56, as shown in Figure 10. During the final operative outward stroke of the handle 43, the rod 42 is coupled therewith to rock the lever 35 in a direction to open the valve 30 to start the rotation of the carrier-drum 16. At a predetermined time in the rotation of the drum 16, the roller 54 on the gear-bearing bell crank lever 48 passes from the cam 55 onto the high spot of the cam 56 to retain the prongs 46 in penetrating engagement with the bacon during the fore part of the skinning operation. After the bacon has been propelled for some distance by the drum during the skinning operation, the lever-rollers 54 drop off the high spots of the cams 56 under the action of their springs 52 and retract the anchoring prongs from the bacon, as shown in Figure 7, so that upon the return movement of the drum the leading or anchored end of the bacon slab will readily free itself from the recess 44 and prongs 45. Upon the swinging of the lever 35 from the position shown in Figure 2 to that shown in Figure 3, the cam 55 is restored to normal and during the movement of such lever from the position shown in Figure 3 to that shown in Figure 1, the operating rod 42 is shifted outwardly to bring its pin 59 to the end of the slot 60, as shown in Figure 11.

Briefly stated, the operation of the machine is as follows:

Assume the parts to be in the position shown in Figure 1, wherein the valve 30 is closed and the tappet arm 37 of the valve-actuating lever 35 is spring-urged against the trip lug 39 of the rack bar 25. The operator now places a slab of bacon on the table portion 11 and the front or leading edge of the bacon in pierced, retaining engagement with the fixed prongs 45. The operator then opens the valve to the position shown in Figure 2 by actuating the handle 43 outwardly, which first projects the prongs 46 into anchoring engagement with the bacon and then operates the pneumatic transmission means to propel the rack 25 in a direction to rotate the drum 16 clockwise and present the bacon to the knife 17 for skinning the bacon. Just prior to the bacon encountering the knife, the bell crank lever rollers 54 engage the high spots of the cams 56 to maintain the prongs 46 in penetrating engagement with the bacon to securely hold it to the drum during the initial skinning act, such prongs being automatically released before the end of such act in the manner previously described. At a predetermined time in the forward movement of the rack 25, its trip lug 38 encounters the lever-tappet 36 and automatically sets the valve to a position to effect a return movement of the rack and a counter-clockwise movement of the drum. This position of the parts is shown in Figure 3, wherein it will be noted that the bacon has been deposited upon the table portion 13 while the severed skin is still clinging to the periphery of the drum. During the counter-clockwise movement of the drum, the bacon skin is intercepted by a blade 61 normally held by a spring 62 in bearing contact with the drum. Associated with this blade is a deflector 63, such parts acting, during the return of the drum to its initial position, to intercept and direct the bacon skin into the chamber 14. When the rack reaches the end of its return stroke, the trip lug 39 encounters the lever-tappet 37 to rotate the valve to the closed position shown in Figure 1, ready for the next skinning operation.

If desired, when skinning fresh bacon, a spring-urged pressure roller 64 may be disposed over the drum 16 in advance of the knife 17 for effectually holding the bacon firmly against the drum when it first contacts the knife. As shown in Figures 12 and 13, this roller may be supported at its ends in bearings 65 guided for vertical displacement in hollow brackets 66 rising from the table 11 and housing springs 67 engaging said bearings for urging the roller into yieldable contact with the bacon.

I claim as my invention:

1. A bacon skinning machine, comprising a support, a knife mounted thereon, a bacon carrier mounted on said support in correlation with said knife for movement relative thereto in one direction to propel the bacon past the same for severing the skin therefrom and in the opposite direction to remove the severed skin from the carrier, means disposed in proximity to said carrier for removing such skin therefrom during its movement in the opposite direction, means on said carrier and facing in the direction of its skin-severing movement for anchoring the leading end of the bacon thereto, said anchoring means facing in a direction opposite to the movement of the carrier during the removal of the skin from the carrier, and motion-transmitting means operatively connected to said carrier for governing its movements at predetermined times in opposite directions.

2. A bacon skinning machine, comprising a support, a knife mounted thereon, a bacon carrier mounted on said support in correlation with said knife for movement relative thereto in opposite directions, means on said carrier for anchoring the bacon thereto for moving it in one direction past the knife to sever the skin therefrom, means disposed in proximity to said carrier for directing the skinned bacon therefrom during the movement of the carrier in one direction and for directing the severed skin from said carrier during its movement in the opposite direction, respectively, means for transmitting motion to said carrier in opposite directions, and means operatively connected to said transmission means for governing the movement of the carrier in one direction or the other.

3. A bacon skinning machine, comprising a table having a portion for receiving the bacon to be skinned and a portion spaced therefrom for receiving the skinned bacon, reversibly-movable means disposed between said table-portions for conveying the bacon skin-side down from one portion toward the other and delivering the skinned bacon onto said last-named table-portion during the movement of such means in one direction, a knife disposed over said movable means in the path of the conveyed bacon for severing the skin therefrom, means disposed in proximity to said conveying means for intercepting and directing the severed skin therefrom during the movement of the conveying means in the opposite direction, and motion-transmitting means operatively connected to the bacon-conveying means for governing its movements at predetermined times in opposite directions.

4. A bacon skinning machine, comprising a table having a portion for receiving the bacon to be skinned and a portion spaced therefrom for receiving the skinned bacon, a reversibly-movable drum disposed between said table-portion having means thereon for releasably connecting a bacon-slab thereto with its skin-side in contact with the drum, a knife disposed over said drum for severing the skin from the bacon during the movement of the drum in one direction and directing the skinned bacon onto the table-portion at the delivery side of the drum, means disposed beneath said last-named table-portion and in proximity to the periphery of said drum for intercepting and directing the severed skin from the latter during its movement in the reverse direction, and motion-transmitting means operatively connected to said drum for governing its movements at predetermined times in opposite directions.

5. A bacon skinning machine, comprising relatively-movable carrier and skin-severing means, means applied to said carrier for anchoring the bacon thereto during the skinning operation including an angular-shaped notch in the carrier for receiving the end of the bacon and a plurality of fixed prongs and a plurality of movable prongs disposed crosswise of said notch, manual controlled cam means operatively connected to said movable prongs for initially actuating them into anchoring engagement with the notch-receiving portion of the bacon, and other cam means disposed in correlation with said manually-controlled cam means and operatively associated with said movable prongs for retaining them in anchored engagement with the bacon and for automatically actuating them at a predetermined time in the skinning operation to a position released from the bacon.

6. A bacon skinning machine, comprising a support, a knife mounted thereon, a bacon carrier mounted on said support in correlation with the knife for movement relative thereto to propel the bacon past the same for severing the skin therefrom, a transmission mechanism for said carrier including a control means for governing its movement, means applied to said carrier for anchoring the bacon thereto including elements projectable into and out of anchoring position, means operatively associated with said anchoring elements and operatively connected to the transmission mechanism control means for projecting such elements into anchoring engagement with the bacon at a predetermined time in the operation of said control means, and other means operatively associated with said anchoring elements for automatically actuating them at a predetermined time in the skinning operation to a position released from the bacon.

7. A bacon skinning machine, comprising a support, a knife mounted thereon, a bacon carrier mounted on said support in correlation with said knife for movement relative thereto in one direction to propel the bacon past the same for severing the skin therefrom and in the opposite direction to remove the severed skin from the carrier, motion-transmitting means for actuating said carrier in one direction and then the other, a control device including an operating member for manually initiating the operation of said transmission means, and means operatively connected with the transmission means and the control device for automatically governing the latter at predetermined times for reversing the direction of movement of the carrier and arresting such movement, respectively.

8. A bacon skinning machine, comprising a support, a knife mounted thereon, a bacon carrier mounted on said support in correlation with said knife for movement relative thereto in one direction to propel the bacon past the same for severing the skin therefrom and in the opposite direction to remove the severed skin from the carrier, pneumatic drive means operatively connected to said carrier for actuating it in one direction and then the other, a valve including a control lever for governing said pneumatic means, and trip devices applied to said drive means adjacent its opposite ends and engageable at predetermined times with said control lever for automatically initiating and arresting the reverse movement of the carrier.

9. A bacon skinning machine, comprising a support, a knife mounted thereon, a bacon carrier mounted on said support in correlation with said knife for movement relative thereto in one direction to propel the bacon past the same for severing the skin therefrom and in the opposite direction to remove the severed skin from the carrier, pneumatic drive means operatively connected to said carrier for actuating it in one direction and then the other, a valve including a control lever for governing said pneumatic means, a manually-operable connection to said lever for initiating the actuation of said drive means to start the skinning operation, said lever having tappet arms projecting therefrom and trip elements applied to said drive means adjacent its opposite ends and operatively engageable with the companion tappet arms at predetermined times in the cycle of operations for automatically setting said valve to a reverse driving position and to a position for closing the valve and arresting said driving means, respectively.

10. A bacon skinning machine, comprising a frame, a knife mounted thereon, a bacon carrier mounted on said frame in correlation with the knife for movement relative thereto, means applied to said carrier for movement into and out of anchoring engagement with the bacon to be skinned, means for normally urging said anchoring means to a released position, adjustable means applied to said carrier and operatively connected to said anchoring means for projecting the same into anchoring engagement with the bacon, means for transmitting motion to said carrier including a shiftable control member having an operating rod connected thereto, a sleeve guided on said rod and terminating at one end in a handle and operatively connected at its opposite end to said adjustable means, and a lost motion connection between said rod and said sleeve to permit an independent movement of the latter relative to the former during the initial displacement of the sleeve to project said adjustable means into anchoring engagement with the bacon and subsequently a coupling of said rod with the sleeve to shift said control member to its operative motion-transmitting position.

11. A bacon skinning machine, comprising a skin-severing means, a revolvable carrier movable relatively thereto, means applied to said carrier for anchoring the bacon thereto during the skinning operation and including a plurality of movable prongs, a supporting shaft for said carrier, a shiftable support for said movable prongs applied to the carrier between its periphery and said shaft, means connected to said support for constantly urging it in a direction to release the prongs from the bacon, and relatively adjustable and stationary cams disposed coaxially of the shaft and engageable with said shiftable support, the adjustable cam initially actuating the support to bring its prongs into engagement with the bacon and the stationary cam constituting a correlated part of the first-named cam to retain the support in its operative position over a predetermined time in the skinning operation.

12. A bacon skinning machine, comprising a skin-severing means, a revolvable carrier movable relatively thereto, means applied to said carrier for anchoring the bacon thereto during the skinning operation and including a plurality of movable prongs, a supporting shaft for said carrier, companion cams disposed side by side in coaxial relation to said shaft, one of said cams being loose on the shaft for independent movement relative to the companion cam and the latter being stationary to assume a relatively fixed position, and a shiftable support for said movable prongs applied to the carrier and operatively engageable with said cams for governing its movement to bring its prongs into and out of penetrating engagement with the bacon.

13. In a bacon skinning machine, a carrier having a notch with inwardly-converging walls in the operating face thereof and with which the leading end of a slab of bacon is adapted to engage, anchoring prongs projecting crosswise from one of the notch-walls below the face of the carrier and adapted for penetrating engagement with the contiguous bottom side of the bacon received in the notch, and releasable anchoring prongs operatively associated with the opposing notch-wall and below the face of the carrier for movement into and out of penetrating engagement with the end face of the notch-engaging portion of the bacon.

14. In a bacon skinning machine, a carrier having a notch with inwardly-converging walls in the operating face thereof and with which the leading end of a slab of bacon is adapted to engage, anchoring prongs projecting crosswise from one of the notch-walls below the face of the carrier and adapted for penetrating engagement with the contiguous bottom side of the bacon received in the notch, a member disposed on the opposite side of said carrier for movement toward and from the same and having a plurality of prongs thereon projectable through the opposing wall of said notch below the operating face of the carrier for penetrating engagement with the end face of the notch-engaging portion of the bacon, means engageable with said member for manually actuating the same in a direction to project its prongs into the bacon, and means operatively engageable with said member and movable with the carrier for retaining such member in its projected position over a predetermined time in the skinning operation.

ADRIAN C. VAN HOOYDONK.